US007835339B1

(12) United States Patent
Benveniste

(10) Patent No.: US 7,835,339 B1
(45) Date of Patent: Nov. 16, 2010

(54) DYNAMIC CHANNEL ASSIGNMENT IN WIRELESS AD HOC NETWORKS

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 616 days.

(21) Appl. No.: 11/394,921

(22) Filed: Mar. 31, 2006

Related U.S. Application Data

(60) Provisional application No. 60/666,638, filed on Mar. 31, 2005, provisional application No. 60/709,820, filed on Aug. 22, 2005.

(51) Int. Cl.
*H04B 7/208* (2006.01)
*H04L 12/413* (2006.01)
*H04W 4/00* (2009.01)
(52) U.S. Cl. ...................................... 370/344; 370/447
(58) Field of Classification Search ........................ None
See application file for complete search history.

(56) References Cited

U.S. PATENT DOCUMENTS

| 4,747,101 | A | * | 5/1988 | Akaiwa et al. | ............... | 370/329 |
| 7,197,315 | B1 | * | 3/2007 | Stephens et al. | ............ | 455/450 |
| 7,415,278 | B2 | * | 8/2008 | Zhao et al. | .................. | 455/447 |
| 2004/0240426 | A1 | * | 12/2004 | Wu et al. | .................... | 370/350 |
| 2005/0058151 | A1 | * | 3/2005 | Yeh | ............................ | 370/445 |
| 2006/0217062 | A1 | * | 9/2006 | Saffre et al. | ................ | 455/11.1 |

OTHER PUBLICATIONS

Tseng Y., Chao C., Wu S., Sheu J., Dynamic channel allocation with location awareness for multi-hop mobile ad hoc networks, Computer Communications, vol. 25, No. 7, May 1, 2002, pp. 676-688.*
Katragadda, S., Ganesh Murthy, C.N.S., Ranga Rao, M.S., Mohan Kumar, S., Sachin, R., "A decentralized location-based channel access protocol for inter-vehicle communication," Vehicular Technology Conference, 2003. VTC 2003-Spring. The 57th IEEE Semiannual, vol. 3, No., pp. 1831-1835 vol. 3, Apr. 22-25, 2003.*
Kuek, S.S., Wong, W.C., "Ordered dynamic channel assignment scheme with reassignment in highway microcells," Circuits and Systems, 1991., IEEE International Sympoisum on, vol., No., pp. 954-957 vol. 2, Jun. 11-14, 1991.*

(Continued)

*Primary Examiner*—Daniel J Ryman
*Assistant Examiner*—Christopher Crutchfield
(74) *Attorney, Agent, or Firm*—Chapin IP Law, LLC; David W. Rouille, Esq.

(57) ABSTRACT

A method, apparatus and computer program product for performing dynamic channel assignment in wireless ad hoc networks (wireless mesh and infrastructure BSSs) is presented. A fixed channel assignment order is determined for each link of the network, the fixed channel assignment order enabling simultaneous transmission without co-channel interference. A preference order is loaded for a node, the preference order derived from the fixed channel assignment order. A channel is selected in accordance with the preference order when a node is ready for transmission. A determination is made whether the selected channel is available, and when the selected channel is available then the node transmits on the channel and when the selected channel is not available then a next channel in the preference order is selected for the node and the determination regarding whether the selected channel is available is repeated.

22 Claims, 5 Drawing Sheets

OTHER PUBLICATIONS

Jungmin, So, Vaiidya, Nitin, Multi-Channel MAC for Ad Hoc Networks: Handling Multi-Channel Hidden Terminals Using a Single Transceiver, MobiHoc'04, May 24-26, 2004, pp. 1-12.*

Tseng Y., Chao C., Wu S., Sheu J., Dynamic channel allocation with location awareness for multi-hop mobile ad hoc networks, Computer Communications, vol. 25, No. 7, May 1, 2002, pp. 676-688.*

Katragadda, S., Ganesh Murthy, C.N.S., Ranga Rao, M.S., Mohan Kumar, S., Sachin, R., A decentralized location-based channel access protocol for inter-vehicle communication, The 57th IEEE Semiannual Vehicular Technology Conference, pp. 1831-1835, Apr. 22-25, 2003.*

Tianbo Kuang, Carey Williamson, A bidirectional multi-channel MAC protocol for improving TCP performance on multihop wireless ad hoc networks, 2004, Proceedings of the 7th ACM international symposium on Modeling, analysis and simulation of wireless and mobile systems, Oct. 4-6, 2004, pp. 301-310.*

Tseng Y., Chao C., Wu S., Sheu J., Dynamic channel allocation with location awareness for multi-hop mobile ad hoc networks, Computer Communications, vol. 25, No. 7, May 1, 2002, pp. 676-688.*

Katragadda, S., Ganesh Murthy, C.N.S., Ranga Rao, M.S., Mohan Kumar, S., Sachin, R., A decentralized location-based channel access protocol for inter-vehicle communication, The 57th IEEE Semiannual Vehicular Technology Conference, pp. 1831-1835, Apr. 22-25, 2003.*

* cited by examiner

Table 1

| Channel Choice | MP1 MAP1 | MAP1 MP1 | MP1 MAP2 | MAP2 MP1 | MAP3 Portal1 | Portal1 MAP3 | MP1 Portal1 | Portal1 MP1 |
|---|---|---|---|---|---|---|---|---|
| 1 | 3 | 1 | 6 | 5 | 1 | 3 | 2 | 4 |
| 2 | 4 | 2 | 1 | 6 | 2 | 4 | 3 | 5 |
| 3 | 5 | 3 | 2 | 1 | 3 | 5 | 4 | 6 |
| 4 | 6 | 4 | 3 | 2 | 4 | 6 | 5 | 1 |
| 5 | 1 | 5 | 4 | 3 | 5 | 1 | 6 | 2 |
| 6 | 2 | 6 | 5 | 4 | 6 | 2 | 1 | 3 |

Table 2

| Channel Choice | MP1 MAP1 | MAP1 MP1 | MP1 MAP2 | MAP2 MP1 | MAP3 Portal1 | Portal1 MAP3 | MP1 Portal1 | Portal1 MP1 |
|---|---|---|---|---|---|---|---|---|
| 1 | 2 | 2 | 5 | 5 | 3 | 3 | 4 | 4 |
| 2 | 3 | 3 | 6 | 6 | 4 | 4 | 5 | 5 |
| 3 | 4 | 4 | 1 | 1 | 5 | 5 | 2 | 2 |
| 4 | 5 | 5 | 2 | 2 | 2 | 2 | 3 | 3 |

Table 3

| MP1 MAP1 | MAP1 MP1 | MP1 MAP2 | MAP2 MP1 | MAP3 Portal1 | Portal1 MAP3 | MP1 Portal1 | Portal1 MP1 |
|---|---|---|---|---|---|---|---|
| 3, 4 | 1 | 6 |  | 1 | 3 | 2 | 5 |

*Figure 3*

DYNAMIC CHANNEL ASSIGNMENT IN WIRELESS AD HOC NETWORKS

CROSS REFERENCE TO RELATED APPLICATIONS

The present application claims the benefit of U.S. Provisional Patent Application No. 60/666,638, filed on Mar. 31, 2005, and U.S. Provisional Patent Application No. 60/709,820 filed Aug. 22, 2005; both of which are incorporated herein by reference.

BACKGROUND

Growth in demand for WLANs is driving the development of new technology to provide higher throughput. To a greater extent this growth is due to the increased number of users and applications desiring wireless transmission and to a lesser extent to the emergence of new applications needing higher transmission rates along a single connection between two points. Previous work has focused on increasing link throughput. This is necessary for single-stream high throughput applications. While it helps increase aggregate throughput, it is not the only way to do so. A MAC-based approach that enables the parallel use of multiple channels in a BSS, or a wireless mesh, can increase aggregate throughput. A mesh network is a network that employs one of two connection arrangements, full mesh topology or partial mesh topology. In the full mesh topology, each node is connected directly to each of the others. In the partial mesh topology, nodes are connected to only some, not all, of the other nodes. A mesh network may contain Mesh Points, Mesh Access Points (MAPs) and portals, collectively referred to as nodes. A portal is a gateway which provides an infrastructure mesh network access to a Distribution System (DS).

IEEE 802.11 has been allocated multiple non-overlapping channels. (i.e., three channels are available in the 2.4 GHz ISM RF band for 802.11b/g and twelve channels in the 5 GHz U-NII RF band for 802.11a). These channels can be used simultaneously, either in separate devices or in the same device. Ways to avoid the interference (referred to as adjacent channel interference or ACI) that would result from energy from the transmitter side lobes spreading out across the spectrum onto the other channel are described in co-pending provisional patent application titled "Mesh Mac and Adjacent Channel Interference", application No. 60/709,820 filed Aug. 22, 2005. Multiple radios are useful in stations where high traffic concentration is expected.

An approach that offers both multi-channel and multi-radio capabilities appears in the co-pending patent application Ser. No. 11/393,127, titled "A Protocol For Wireless Multi-Channel Access Control", filed Mar. 29, 2006, the disclosure of which is incorporated by reference herein. It describes the CCC (Common Control Channel) MAC protocol. CCC utilizes two types of logical channels, the control channel and the data channels.

The physical channel used by a node for control is static, it should not change rapidly. Therefore, for a node using a single radio, the choice of the physical channel to use for data traffic is fixed: it is the control channel. The physical channel(s) used by a node to transmit data traffic may be either fixed or vary dynamically. The different ways data channels may be assigned/selected range from totally fixed in advance to totally demand-based (i.e. dynamic).

When more than one radio is available at a node, the choice of a data channel may be totally or partially specified in advance. For nodes with multiple radios, three variants exist:

a) Fixed by source-destination node pair: The choice of data channel to transmit to a given neighbor node is fixed;
b) Fixed by source node: Of the channels assigned the source node, the choice of a channel to transmit varies; it is made at the time of transmission; or
c) Fixed by destination node: The source node selects from among data channel(s) assigned to the destination node The source node must have advance knowledge of its neighbors' assigned data channels. In general, fixing the assigned channels at the source node generates a more compact re-use pattern and thus increases channel re-use efficiency

SUMMARY

Conventional mechanisms such as those explained above suffer from a variety of deficiencies. One such deficiency in conventional systems is that, while fixing the assigned channels at the source node generates a more compact re-use pattern and thus increase channel re-use efficiency, coordination between nodes (e.g., a centralized controller) is needed. In addition, because of traffic variation over time, assigned channels may sit idle if there is no traffic pending transmission. A flexile channel use scheme that allows a node/link not assigned a particular channel to use such channel, if available, would result in better utilization of data channels. Presented is a scheme in the context of an ad hoc network (e.g., a wireless mesh and/or a BSS). The scheme applies to any configuration the CCC MAC protocol can be used.

Embodiments of the invention significantly overcome such deficiencies and provide mechanisms and techniques that provide dynamic assignment of data channels in ad hoc networks which increases channel re-use efficiency.

In a particular embodiment of a method for performing selective dynamic channel assignment in an ad hoc network, the method includes determining a fixed channel assignment order for each link of the ad hoc network, the fixed channel assignment order enabling simultaneous transmission with minimum co-channel interference. The method further includes loading a preference order for a node, the preference order derived from the fixed channel assignment order and selecting a channel in accordance with the preference order when a node is ready for transmission. Additionally the method comprises determining whether the selected channel is available, and when the selected channel is available then transmitting on the channel by the node and when the selected channel is not available then selecting a next channel in the preference order for the node and repeating the determining whether the selected channel is available.

Other embodiments include a computer readable medium having computer readable code thereon for providing selective dynamic channel assignment for a node in an ad hoc network. The computer readable medium includes instructions for loading a preference order for a node, the preference order derived from a fixed channel assignment order which has been determined for each link of an ad hoc network, the fixed channel assignment order enabling simultaneous transmission without co-channel interference. The computer readable medium further includes instructions for selecting a channel in accordance with the preference order when a node is ready for transmission, and instructions for determining whether the selected channel is available, and when the selected channel is available then transmitting on the channel by the node and when the selected channel is not available then selecting a next channel in the preference order for the node and repeating the determining whether the selected channel is available.

Still other embodiments include a computerized device, configured to process all the method operations disclosed herein as embodiments of the invention. In such embodiments, the computerized device (e.g. a node) includes a memory system, a processor, communications interface in an interconnection mechanism connecting these components. The memory system is encoded with a process that provides selective dynamic channel assignment for a node in an ad hoc network as explained herein that when performed (e.g. when executing) on the processor, operates as explained herein within the computerized device to perform all of the method embodiments and operations explained herein as embodiments of the invention. Thus any computerized device that performs or is programmed to perform processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing selective dynamic channel assignment for a nodes in an ad hoc network as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 shows a table showing a channel assignment snapshot; and

DETAILED DESCRIPTION

Dynamic assignment of data may be used to assign channels to nodes in a wireless ad hoc network (e.g. a wireless mesh and/or BSS network). One method of dynamic channel assignment is referred to as random dynamic channel assignment. In the random dynamic channel assignment methodology the source node selects a channel based on its availability, as indicated by the channel use state or the NAV. The source node attempts to reserve the selected data channel by an CC-RTS/CC-CTS exchange on the control channel. If the reservation request fails, but the Radio Counter in the CC-CTS indicates that there are available radios at the destination, another channel is selected. Random dynamic channel assignment gives rise to the simplest implementation.

A preferred method of assigning channels in a wireless ad hoc network is by performing selective dynamic channel assignment. In selective dynamic channel assignment the choice of a data channel for a transmission is determined at the time of transmission, but it must follow specific guidelines. An order of channel preference is specified when the source node selects a channel; successful reservation is based on availability. The order of channel preference can be formulated through different ways. One such way would be through learning. For instance, the node keeps track of the CC-RTS/CC-CTS exchanges on the control channel and creates an order of channel preference based on utilization of a channel (i.e., percent of the time a given channel is reserved), and reservation request successes and failures for a given channel.

The order of channel preference can be based on expected traffic loads and/or efficient re-use patterns of the channel. Once a channel is selected, the procedure is similar to that of random dynamic channel assignment. Selective dynamic channel assignment, when properly designed, surpasses both fixed and random dynamic channel assignment.

Figure 1:
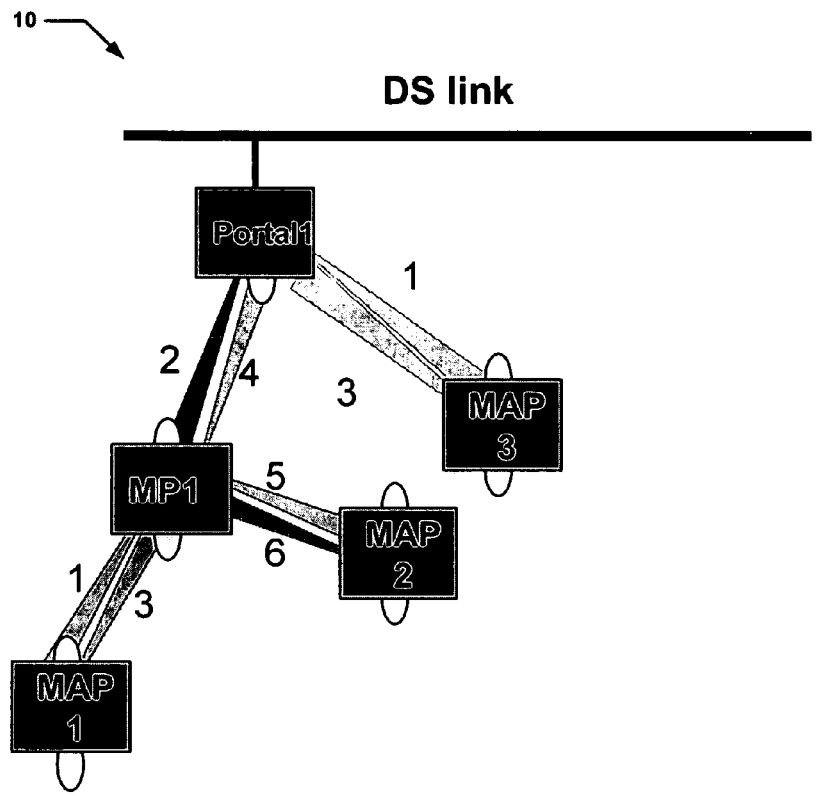
FIG. 1 depicts a block diagram of an ad hoc network having channels assigned to various nodes in accordance with embodiments of the invention.

Another example of a selective dynamic channel assignment procedure, depicted in FIG. 1, combines the compactness of channel re-use in fixed channel assignment with the flexibility of dynamic channel assignment. A fixed channel assignment is determined by optimization methods to maximize re-use (e.g. maximum packing algorithm is used to maximize throughput in the network) and is used as the reference channel assignment. A fixed channel assignment that maximizes throughput would use channels as closely as possible, provided there is no co-channel interference between users of the same channel(s). Various optimization methods could be used to obtain such assignment. A maximum packing algorithm would be an example used to maximize throughput in the network.

Table 1 illustrates possible channel assignments that maintain the same co-channel assignment relationships. That is, the group of links (nodes) assigned the same channel—known as a 'co-channel group'—in the first row, continue to be assigned the same channel in subsequent rows; the assigned channel is different, however. According to the dynamic channel assignment procedure, in attempt is made to assign the same channel to all members of a co-channel group. Channels are selected for each link in the preference order indicated in the corresponding column of Table 1. The various rows of Table 1 indicate various channel assignment possibilities. The channel preference order for each link (node) is a permutation of the same list of channels; each preference order starts at the channel corresponding to the starting optimal channel assignment. Each row thus preserves a re-use of the same compactness as the optimal channel assignment, but allows different channels to be assigned. The channel preference order is loaded in the memory of the node. A channel is selected when a TXOP is ready for transmission at a node. The CCC protocol determines whether the chosen channel is idle through the CC-RTS/CC-CTS exchange on the control channel. If the reservation is declined, the next channel in the preference order is selected. This way, nodes with traffic pending check if it is possible to start at the optimal fixed channel assignment, and will deviate from such assignment in a coordinated manner, increasing the chances that co-channel groups will be assigned the same channel.

In a particular example, according to Table 1, the first choice for a channel to use for communication over the link between MP1 and MAP1 is channel 3, as indicated in the first row and column of Table 1 and shown in ad hoc network 10. Similarly, channel selections for the remaining links are also shown in ad hoc network 10 in accordance with the first row of Table 1. Thus, the link between MAP1 and MP1 uses channel 1, the link between MP1 and MAP2 uses channel 6, the link between MAP2 and MP1 uses channel 5, the link between MAP3 and Portal1 uses channel 1, the link between Portal1 and MAP3 uses channel 3, the link between MP1 and Portal1 uses channel 2, and the link between Portal1 and MP1 uses channel 4. This is a best-case scenario, since the first channel choice was available for each link.

Referring back to the link between MP1 and MAP1, if channel 3 were unavailable, the MP would then cycle to the next channel choice (the next row in the column for MP1-MAP1) and attempt to use channel 4. If channel 4 were available, the link would use channel 4, and the remaining links would use their existing channels (the remainder of row 1 of Table 1). Similarly, if the link between MP1 And MAP2 could not acquire its first choice of channel 6, the MP would cycle to the next choice in the column, channel 1. If channel 1 were not available, the node would cycle to the next entry in the column, channel 2. This would repeat until the link could acquire a channel to use.

The channel preference order is loaded in the memory of the node. A channel is selected when a MTXS is ready for transmission at a node. The node will check the availability of a channel in its preference order, and if not available, it will move to the next channel in that order. The NAV(s) maintained by a node for a given channel indicate whether a channel may be used without causing a collision. The MCF protocol provides information on channel availability through the MRTS/MCTS exchanged so far and other NAV information available to the node. If a MRTS is sent and the reservation is declined, the next channel in the preference order is selected.

Figure 2:
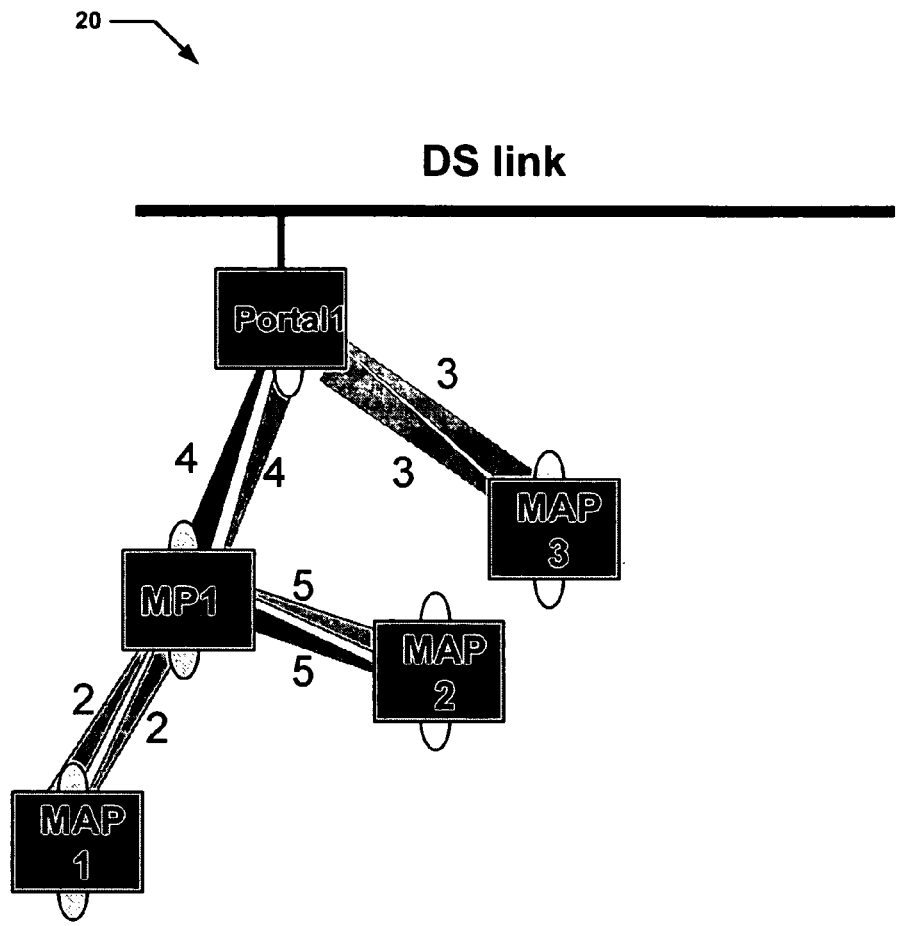
FIG. 2 a block diagram of the ad hoc network of FIG. 1 wherein different channels assignments have been provided in accordance with embodiments of the invention.

Referring now to FIG. 2, in some embodiments a link can use the same channel for communication in both directions between a pair of nodes. In a particular example, according to Table 2, the first choice for a channel to use for communication over the link between MP1 and MAP1 is channel 2, as indicated in the first row and column of Table 2 and shown in ad hoc network 20. Similarly, channel selections for the remaining links are also shown in ad hoc network 20 in accordance with the first row of Table 2. Thus, the link between MAP1 and MP1 also uses channel 2, the link between MP1 and MAP2 and the link between MAP2 and MP1 use channel 5, the link between MAP3 and Portal1 and the link between Portal1 and MAP3 use channel 3, and the link between MP1 and Portal1 and the link between Portal1 and MP1 use channel 4. This is a best-case scenario, since the first channel choice was available for each link.

Referring back to the link between MP1 and MAP1, if channel 2 were unavailable, the MP would then cycle to the next channel choice (the next row in the column for MP1-MAP1) and attempt to use channel 3. If channel 3 were available, the link would use channel 3, and the remaining links would use their existing channels (the remainder of row 1 of Table 2). Similarly, if the link between MP1 And MAP2 could not acquire it's first choice of channel 5, the MP would cycle to the next choice in the column, channel 6. If channel 6 were not available, the node would cycle to the next entry in the column, channel 1. This would repeat until the link could acquire a channel to use.

If multiple radios are available per a node, more than one channel can be used along a link if needed. This is shown in Table 3 of FIG. 3. To do so, one may not take care not to cause collisions. In this example, MP1-MAP1 selects channels 3 and 4 according to its list of preferred channels. Portal1-MP1 cannot use channel 4, so it selects channel 5—its next choice. This is possible, as MAP2-MP1 has no traffic. The remaining links can use the channel on the top of their list When traffic channels are assigned on demand, nodes must observe virtual carrier sense with respect to independent BSS traffic using the various traffic channels. A node can keep track of independent NAV settings on a traffic channel, by tuning the traffic radio tuned to the top channel in the preference order that is available. This way, the node will keep track of all NAV setting requests on the data channel and will use them in setting the NAV maintained by the node for that channel.

It is possible however, for the source node (of a pair of nodes) to have received a NAV setting request not heard by the destination node, or vice versa. As a result, a different traffic channel is monitored by the two end points. This could lead to a transmission that may not be heard by the destination, in which case it will have to be retransmitted. It is worth noting that the CCC nodes will be respecting virtual carrier sensing of the independent stations during the transmission. An ack may cause collision to independent transmissions, unless it is sent on the control channel. Alternatively, a destination node that has not been monitoring the traffic channel may request a RTS/CTS to be sent on the data channel before data transmission commences.

Figure 4A:
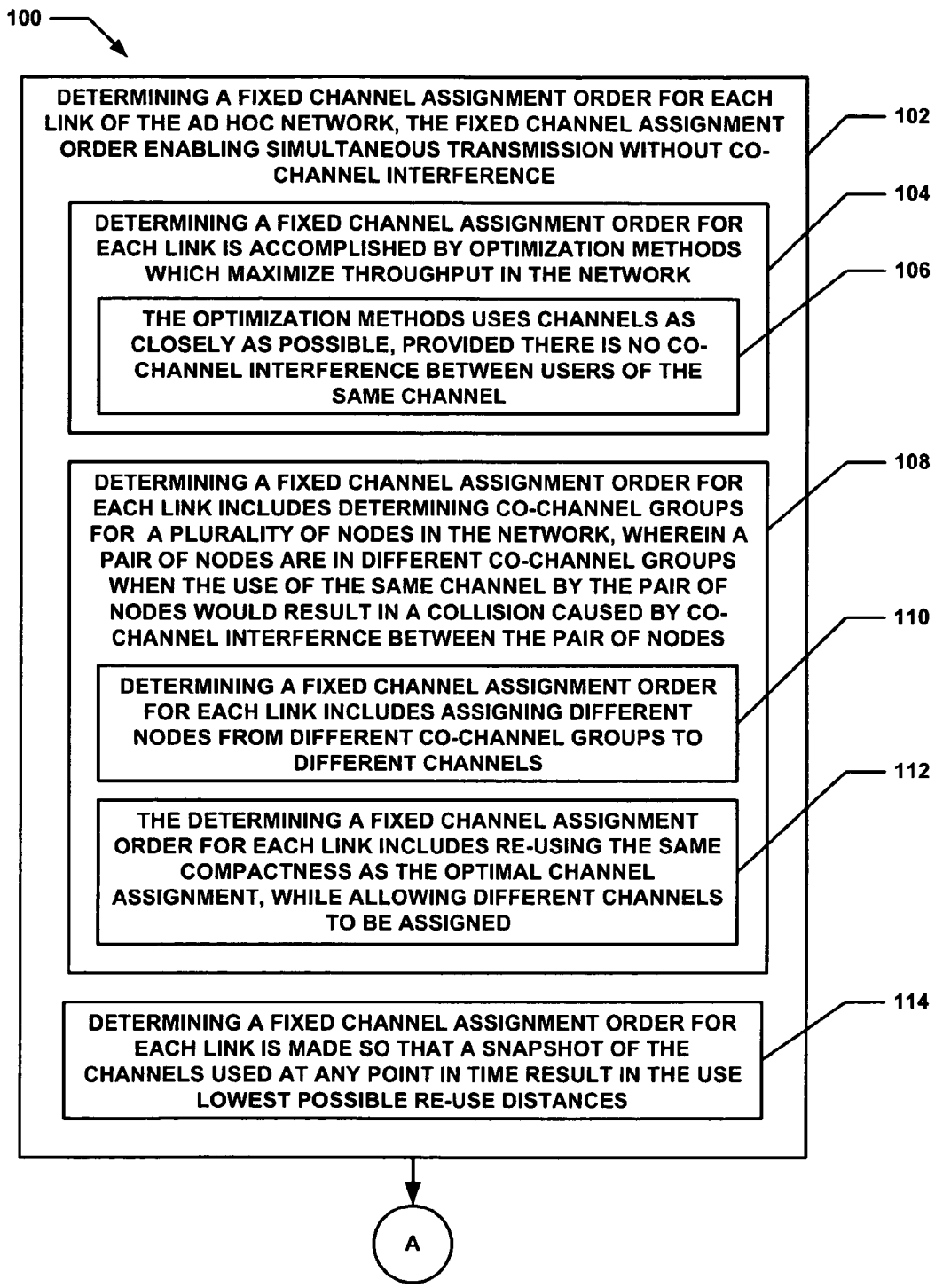
FIGS. 4A and 4B depict a flow diagram of a particular embodiment of a method for performing selective dynamic channel assignment in an ad hoc network, in accordance with embodiments of the invention.
Figure 4B:
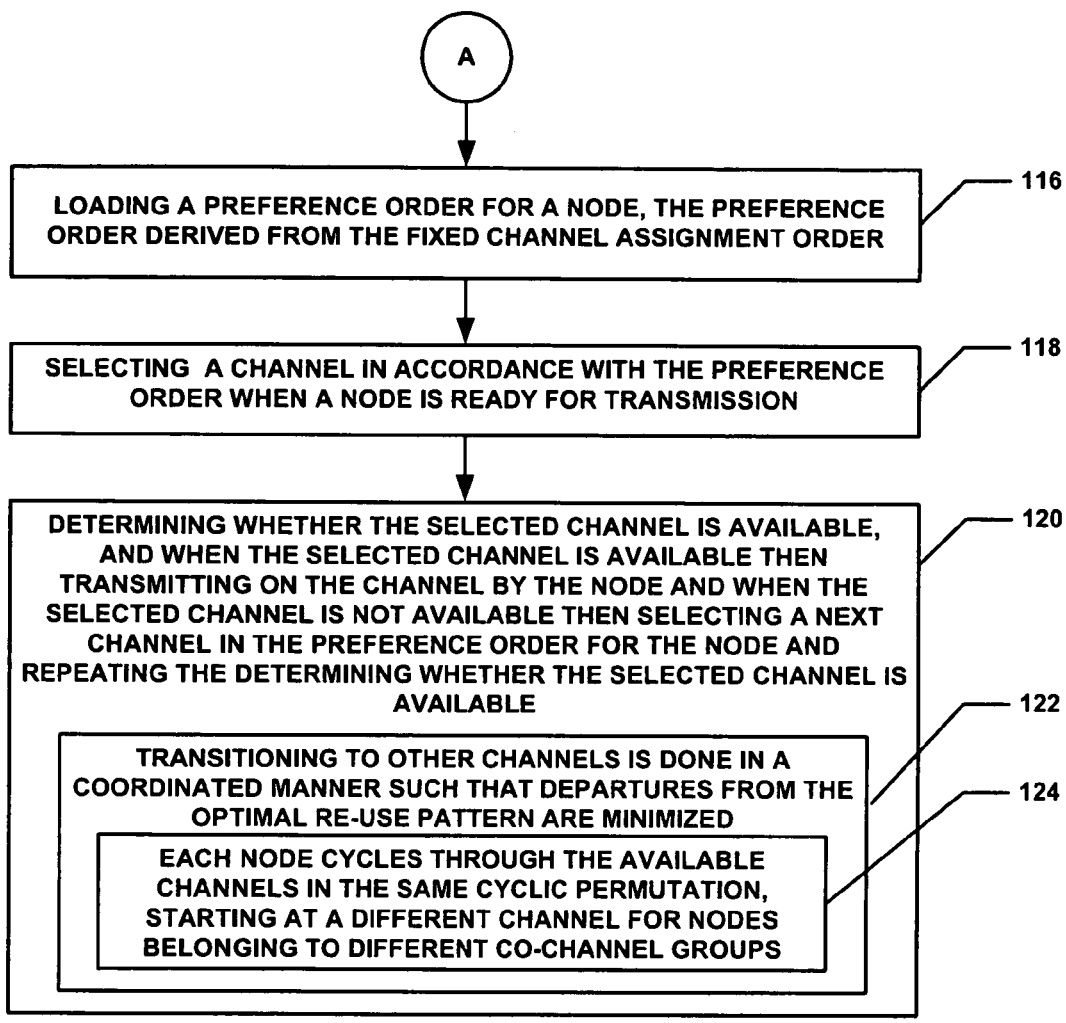

A flow chart of the presently disclosed method is depicted in FIGS. 4A and 4B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 4A and 4B, a particular embodiment of a method 100 of performing selective dynamic channel assignment in an ad hoc network is shown. The method begins with processing block 102 which discloses determining a fixed channel assignment order for each link of the ad hoc network, the fixed channel assignment order enabling simultaneous transmission without co-channel interference. Processing block 104 recites the determining a fixed channel assignment order for each link is accomplished by optimization methods which maximize throughput in the ad hoc network. This may include basing the channel preference on utilization of a channel (i.e., percent of the time a given channel is reserved), and reservation request successes and failures for a given channel.

Processing block 106 discloses the optimization method uses channels as closely as possible, provided there is no co-channel interference between users of the same channel.

The determining a fixed channel assignment order further includes, as stated in processing block 108, the determining a fixed channel assignment order for each link includes determining co-channel groups for a plurality of nodes in the ad hoc network, wherein a pair of nodes are in different co-channel groups when the use of the same channel by the pair of nodes would result in a collision caused by co-channel interference between the pair of nodes. This may include, as disclosed in processing block 110, assigning different nodes from different co-channel groups to different channels. Processing block 112 states the determining a fixed channel assignment order for each link includes re-using the same compactness as the optimal channel assignment, while allowing different channels to be assigned.

Processing block 114 recites determining a fixed channel assignment order for each link is made so that a snapshot of the channels used at any point in time result in the use lowest possible re-use distances. To maintain the compactness of the assignment as much as possible, departures from the optimal re-use pattern are minimized by transitioning to other channels in a coordinated manner.

Processing block 116 discloses loading a preference order for a node, the preference order derived from the fixed channel assignment order. Each node has its own preference order to use for determining a preferred channel. Processing block 118 states selecting a channel in accordance with the preference order when a node is ready for transmission. This occurs when a MTXS is ready to be sent out by the node.

Processing block 120 recites determining whether the selected channel is available, and when the selected channel is available then transmitting on the channel by the node and when the selected channel is not available then selecting a next channel in the preference order for the node and repeating the determining whether the selected channel is available. Processing block 122 states the transitioning to other channels is done in a coordinated manner such that departures from the optimal re-use pattern are minimized. Processing block 124 states each node cycles through the available channels in the same cyclic permutation, starting at a different channel for nodes belonging to different co-channel groups.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs selective dynamic channel assignment in a wireless ad hoc network, the method comprising:
   determining a fixed channel assignment order for each link of the network, the fixed channel assignment order enabling simultaneous transmission without co-channel interference;
   loading a preference order for a node link, the preference order based on said fixed channel assignment order for the link, wherein said loading a preference order for the node link comprises dynamically determining at transmission time said preference order and wherein said preference order is further based on a combination of a percent of time a channel is reserved, reservation request successes on a channel, and reservation request failures on a channel;
   selecting a channel to use for the node link transmission in accordance with said preference order when the node link is ready for transmission; and
   determining whether the selected channel is available for the node link transmission, and when the selected channel is available then transmitting on said channel by said node and when the selected channel is not available then selecting a next channel in said preference order for said node and repeating said determining whether the selected channel is available.

2. The method of claim 1 wherein said fixed channel assignment order assigns channels for each link as closely as possible, provided there is no co-channel interference between users of the same channel on different links.

3. The method of claim 1 wherein said determining a fixed channel assignment order for each link includes determining co-channel groups for a plurality of nodes in said network, wherein a pair of nodes are in different co-channel groups when the use of the same channel by links originating from said pair of nodes would result in a collision caused by co-channel interference between said pair of nodes.

4. The method of claim 3 wherein said determining a fixed channel assignment order for each link includes assigning links originating from nodes belonging to different co-channel groups to different channels.

5. The method of claim 3 wherein said determining a fixed channel assignment order for each link includes re-using the same compactness as the optimal channel assignment, while allowing different channels to be assigned.

6. The method of claim 3 wherein nodes with pending traffic for a link check to see if it is possible to transmit on the first channel in the preference order for the node link and deviate from transmitting on the first channel in the preference order for the node link in a coordinated manner increasing the chances that links originating from nodes in the same co-channel groups will be assigned to a same channel.

7. The method of claim 1 wherein said determining a fixed channel assignment order for each link is made so that a snapshot of the channels used at any point in time result in the use lowest possible re-use distances.

8. The method of claim 1 wherein the fixed channel assignment order for the links of each node cycles through the available channels in the same cyclic permutation, starting at a different channel for each link originating from a node belonging to a different co-channel group.

9. The method of claim 1 wherein said percent of time a channel is reserved is based on Control Channel Request To Send (CC-RTS) and Control Channel Clear To Send (CC-CTS) exchanges on a control channel.

10. A wireless ad hoc network system comprising:
a plurality of nodes;
a plurality of links interconnecting said nodes; and
a plurality of channels for use by said nodes to communicate over a link,
wherein a fixed channel assignment order for each link of the network is determined by the plurality of nodes, the fixed channel assignment order enabling simultaneous transmission without co-channel interference,
wherein a preference order for a node link is loaded in a node wherein loading a preference order for a node link comprises dynamically determining at transmission time said preference order and wherein said preference order is based on a combination of a percent of time a channel is reserved, reservation request successes on a channel, and reservation request failures on a channel, wherein the preference order is further based on said fixed channel assignment order,
wherein a channel to use for the node link transmission is selected in accordance with said preference order when the node link is ready for transmission, and
wherein the node determines whether the selected channel is available for the node link transmission, and when the selected channel is available then transmitting on said channel by said node and when the selected channel is not available then selecting a next channel in said preference order for said node and repeating said determining whether the selected channel is available.

11. The wireless ad hoc network system of claim 10 wherein said fixed channel assignment order assigns channels for each link as closely as possible, provided there is no co-channel interference between users of the same channel on different links.

12. The wireless ad hoc network system of claim 10 wherein said channel assignment order for each link includes co-channel groups for a plurality of nodes in said network, wherein a pair of nodes are in different co-channel groups when the use of the same channel by links originating from said pair of nodes would result in a collision caused by co-channel interference between said pair of nodes.

13. The wireless ad hoc network system of claim 12 wherein said fixed channel assignment order for each link includes assigning links originating from nodes belonging to different co-channel groups to different channels.

14. The wireless ad hoc network system of claim 12 wherein said fixed channel assignment order for each link re-uses the same compactness as the optimal channel assignment, while allowing different channels to be assigned.

15. The wireless ad hoc network system of claim 10 wherein said fixed channel assignment order for each link is made so that a snapshot of the channels used at any point in time result in the use of the lowest possible re-use distances.

16. The wireless ad hoc network system of claim 10 wherein the fixed channel assignment order for the links of each node cycles through the available channels in the same cyclic permutation, starting at a different channel for each link originating from a node belonging to a different co-channel group.

17. The system of claim 10 wherein said percent of time a channel is reserved is based on Control Channel Request To Send (CC-RTS) and Control Channel Clear To Send (CC-CTS) exchanges on a control channel.

18. The wireless ad hoc network system of claim 10 wherein nodes with pending traffic for a link check to see if it is possible to transmit on the first channel in the preference order for the node link and deviate from transmitting on the first channel in the preference order for the node link in a coordinated manner increasing the chances that links originating from nodes in the same co-channel groups will be assigned to a same channel.

19. A tangible computer readable storage medium having computer readable code thereon for providing selective dynamic channel assignment for a node in a wireless ad hoc network, the medium including instructions in which a computer system performs operations comprising:
loading a preference order for a node link, the preference order based on a fixed channel assignment order which has been determined for each link of a network, the fixed channel assignment order enabling simultaneous transmission without co-channel interference,
wherein said loading a preference order for a node link comprises dynamically determining at transmission time said preference order and wherein said preference order is further based on a combination of a percent of time a channel is reserved, reservation request successes on a channel, and reservation request failures on a channel;
selecting a channel to use for the node link transmission in accordance with said preference order when the node link is ready for transmission; and
determining whether the selected channel is available for the node link transmission, and when the selected channel is available then transmitting on said channel by said node and when the selected channel is not available then selecting a next channel in said preference order for said node and repeating said determining whether the selected channel is available.

20. The tangible computer readable medium of claim 19 further comprising:
instructions for transitioning node links to other channels in a coordinated manner such that departures from the optimal re-use pattern are minimized; and
instructions for cycling through the available channels of each node link in the same cyclic permutation, starting at a different channel for links originating from nodes belonging to different co-channel groups.

21. The tangible computer readable medium of claim 19 wherein said percent of time a channel is reserved is based on Control Channel Request To Send (CC-RTS) and Control Channel Clear To Send (CC-CTS) exchanges on a control channel.

22. The tangible computer readable storage network of claim 19 further comprising instructions wherein nodes with pending traffic for a link check to see if it is possible to transmit on the first channel in the preference order for the node link and deviate from transmitting on the first channel in the preference order for the node link in a coordinated manner increasing the chances that links originating from nodes in the same co-channel groups will be assigned to a same channel.

* * * * *